(12) United States Patent
Lam

(10) Patent No.: US 12,576,542 B2
(45) Date of Patent: Mar. 17, 2026

(54) HELICAL PIN GRIPPER

(71) Applicant: LAMUS ENTERPRISES INC., Vancouver (CA)

(72) Inventor: Joe Augustine S.T. Lam, Vancouver (CA)

(73) Assignee: LAMUS ENTERPRISES INC., Vancouver (CA)

( * ) Notice: Subject to any disclaimer, the term of this patent is extended or adjusted under 35 U.S.C. 154(b) by 925 days.

(21) Appl. No.: 17/857,440

(22) Filed: Jul. 5, 2022

(65) Prior Publication Data

US 2024/0009862 A1     Jan. 11, 2024

(51) Int. Cl.
*B25J 15/00* (2006.01)

(52) U.S. Cl.
CPC ................................. *B25J 15/0071* (2013.01)

(58) Field of Classification Search
CPC ............................... B25J 15/0071; B65H 3/30
USPC ......................................................... 294/86.4
See application file for complete search history.

(56) References Cited

U.S. PATENT DOCUMENTS

| | | | |
|---|---|---|---|
| 1,938,484 A * | 12/1933 | Clarin | ................... B67B 7/0405 81/3.2 |
| 3,661,278 A | 5/1972 | Hammerie | |
| 4,553,954 A | 11/1985 | Sewell | |
| 4,637,283 A * | 1/1987 | Bertram | ................ B67B 7/0405 81/3.2 |
| 5,259,395 A * | 11/1993 | Li | ......................... A61N 1/0573 600/375 |
| 5,332,275 A * | 7/1994 | Conway | ..................... B25J 7/00 294/902 |
| 5,895,084 A * | 4/1999 | Mauro | ..................... B25J 15/12 294/100 |
| 6,080,095 A | 6/2000 | Chen | |
| 6,508,497 B1 | 1/2003 | Nerger | |
| 7,083,210 B2 * | 8/2006 | Muramatsu | .............. B25J 15/12 294/99.1 |
| 7,192,393 B2 | 3/2007 | Makar et al. | |
| 7,766,808 B2 | 8/2010 | Zepf | |
| 2009/0146440 A1 * | 6/2009 | Buljo | ................... B25J 11/0045 294/61 |
| 2021/0387817 A1 * | 12/2021 | Favro | ................... B25J 15/0071 |
| 2022/0388181 A1 * | 12/2022 | Balsells Mercade | ..... B26F 1/24 |
| 2024/0141571 A1 * | 5/2024 | Pujar | ....................... B29C 70/38 |

* cited by examiner

*Primary Examiner* — Paul T Chin

(57) ABSTRACT

The present invention relates to a helical pin gripper where a helical pin gripping element is mount at one end of a rotor that is rotated and moved axially to cause a sharpened end of the helical penetrating pin(s) forming part of the gripping element to penetrate an article and move a length of the helical penetrating pin into the article and thereby grip the article.

8 Claims, 6 Drawing Sheets

HELICAL PIN GRIPPER

STATEMENT REGARDING FEDERALLY SPONSORED RESEARCH OR DEVELOPMENT

Not Applicable

REFERENCE TO MICROFICHE APPENDIX

Not Applicable.

FIELD OF INVENTION

The present invention relates to a helical pin gripper and system for gripping and handling boxes particularly corrugated cardboard boxes and the like.

BACKGROUND OF THE PRESENT INVENTION

Many different systems for handling boxes particularly corrugated cardboard boxes and the like have been suggested an many are currently in use. These systems generally include a gripping-systems for engaging with the box and gripping it. For example, it is known to use suction cups to do the gripping, these require a significant amount of power to generate the suction to operate.

Pin systems are also known and used to manipulate a box. Attention is directed to U.S. Pat. No. 4,553,954 issued Nov. 19, 1985; U.S. Pat. No. 6,080,095 issued Jun. 27, 2000; U.S. Pat. No. 7,192,393 issued Mar. 20, 2007; and U.S. Pat. No. 7,766,808 issued Aug. 3, 2010. All of these devices employ straight pins that are positioned with their axes parallel to the surface of the part of the box they are to engage, are located adjacent to the end edge of the portion of the box to be engaged and then the pins are extended axially into the space between the two liners of the corrugated cardboard material of the box. When inserted between the liners the pins are moved radially to move the box or box portion of the box.

U.S. Pat. No. 3,661,278 Issued May 9, 1972 and 6,508, 497 issued Jan. 21, 2003 are examples of systems that also employ straight pins, but in these devices the pins are positions with their axis perpendicular to the surface of the box and are moved axially to penetrate the box surface and into the space between the liners of the corrugated material from with the box is constructed and may then be moved radially to reposition the box. These systems are applied in clamps and opposite sides of the box or the like must be engaged requiring access to opposite sides of the box.

Other penetrating pin type grippers are known wherein the straight pins are moved to penetrate the material at about a 45° and then moved to do the repositioning. Examples of such grippers are manufactured and/or sold by ABQIndusrtial and Schnalz.

Twist pins are well known particularly in the textile industry and used for joining fabrics by squeezing multiple layers of fabric against the head of the twist pin.

BRIEF DESCRIPTION OF THE PRESENT INVENTION

It is an object of the present invention to provide a helical pin gripper and system for gripping and manipulating corrugated cardboard material such as boxes and/or box blanks made of such material and the like.

Broadly the present invention relates to a helical pin gripper, said gripper comprising, a rotor mounted for rotation about a rotational axis, an actuator, a connector connecting said actuator to said rotor for rotating said rotor about said rotational axis while permitting axial movement of said rotor along said rotational axis, a housing surrounding said rotor and cooperating with said rotor to cause said rotator to move axially along said rotational axes as said rotator is rotated, a helical pin gripping element mounted on a free end of said rotor with its helical axis aligned with said rotational axis said helical pin gripping element is comprised of at least one helical penetrating pin with a sharpened end remote from said rotor.

The housing preferable is internally threaded and rotor has threads on its periphery that mate therewith to cause said rotor to axial move along said rotational axis when said rotator is rotated The connector comprises an axially splined shaft, a splined passage with its longitudinal axis concentric with said rotational axis, splines in said passage positioned to cooperate with said splined shaft to rotate said rotor with said splined shaft while permitting said axial movement of said rotor along said rotational axis.

Preferably said actuator is a is a vane type rotary 270-degree air actuator The helical pin gripper further comprising means to adjust the depth of penetration of said sharpened end into the surface of material being gripped by said gripper.

Preferably the helical penetrating pin will have a flat surface adjacent to said housing.

Preferably said helical pin gripping element is provided with two of said helical pin penetrating pins symmetrically positioned around said rotational axis. Preferably said helical pin gripping element is provided with three of said helical pin penetrating pins symmetrically positioned around said rotational axis.

Preferably a plurality of said helical grippers are mounted in spaced relationship with said free end of each said rotor in the same plane.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

The term helical in defining the penetrating pins referred to herein below is intended to mean a helix that is essentially cylindrical i.e. having a substantially constant radius relative to its axis. Obviously small deviations may be tolerated however larger deviations may cause tearing of the substrate being penetrated for gripping as will be apparent from the description below.

Figure 1:
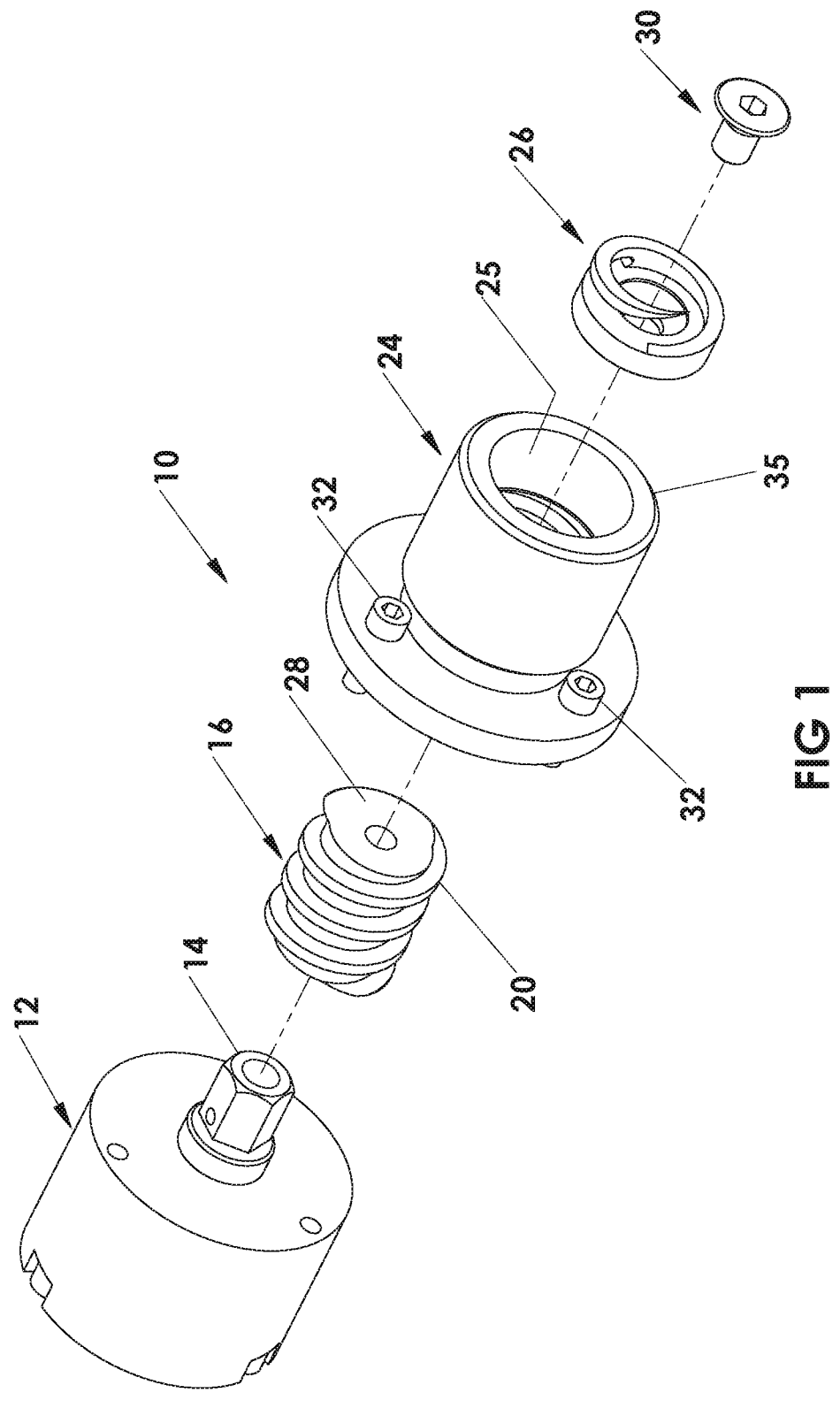
FIG. 1 is an exploded view of a helical pin gripper of the present invention.

FIG. 1 shows the basic element of the gripper 10 of the present invention in exploded view form. As shown the gripper 10 comprises a reversable actuator 12 having a splined drive shaft 14 extending therefrom. The actuator 12 shown in FIG. 1 is a vane type rotary 270-degree air actuator which can be adjustable using additional attachments added onto the outer side of the output shaft. Such activators are commercially available that may be used for 90,180 or 270 degrees of rotation. Any suitable rotor typey actuator may be used in place of the preferred vane type rotary 270-degree air actuator, for example a rack pinon drive, a linear air cylinder, or an electrical actuator.

The chosen actuators will, as shown, in FIGS. 1, will be provided with a connector preferably in the form of a splined drive shaft 14 that drives a rotor 16 by engaging with a similarly splined axially extending bore or passage 18 (not shown in FIG. 1 but can be seen in dash lines in FIGS. 2, 3, 4 and 6) in the rotor 16 to rotate the rotor 16 while permitting it to move axially when being rotated. In the illustrated version the spline on the shaft 14 and thus in the passage 18 is show as having a hexagon cross section, but any suitable shape may be selected.

The rotor 16 is externally threaded as indicated at 20 with threads that mate with corresponding treads 22 (see FIGS. 2, 3, 4 and 8) on the inside 25 of the tubular housing 24 so that when the rotor 16 is rotated in one direction by the actuator 12 the rotor 16 is moved axially in the housing 24 in a first direction axially of the rotor 16 and when it is rotated in the opposite direction it is moved in a second direction opposite to the first direction. This movement is used to move a helical pin 26 gripping element (described in more detail herein below) mounted at the free end 28 of the remote from the activator 12 by as suitable connecting pin 28 between retracted position and an extended gripping position as will be described below.

The housing 24 with the rotor contained therein and the threads 20 and 22 engaged is, in the illustrated version, is bolted to the actuator 12 via suitable bolts 32.

As shown in FIGS. 2, 3, 4, 7 and 9 the housing has threaded to its outer periphery a depth adjustment nut 34 that in the illustrated version of the invention carries a triggering sensor 36 that is used to sense the proximity of the article (e.g., corrugated board) 38 and trigger the actuator 12 to rotate and advance the rotor 16 and thereby the helical pin gripping element 26 to gripping position.

The depth adjustment nut 34 provides a less cumbersome way of adjusting the depth the penetrating pin(s) (to be described below) of the helical pin gripping element 26 penetrate the article 38 than by changing the amount of rotation of the rotor 16 as it permits the use of a fixed rotation of the rotor 16 which provides a fixed length of axial travel of the rotor 16 and thus the pin gripping element 26. The nut 34 engages the surface of the article 38 when the sensor 36 triggers the actuator 12 so simply adjusting the protection of the nut 34 beyond the free end 36 (see FIG. 1) of the housing 24 adjusts the amount the helical pin gripping element 26 projects beyond the housing and nut and the helical penetrating pins 51, or 62 and 64, or 102 and 104 and 106 penetrate(s) the article 38.

Another way to adjust the penetration depth of the helical penetrating pin(s) such as pin 51 or 62, 64 or 102, 104, 106 is by inserting different thickness spacers between the free end 28 of the rotor 16 and the helical pin gripping element 26.

Figures 2, 3, 4:
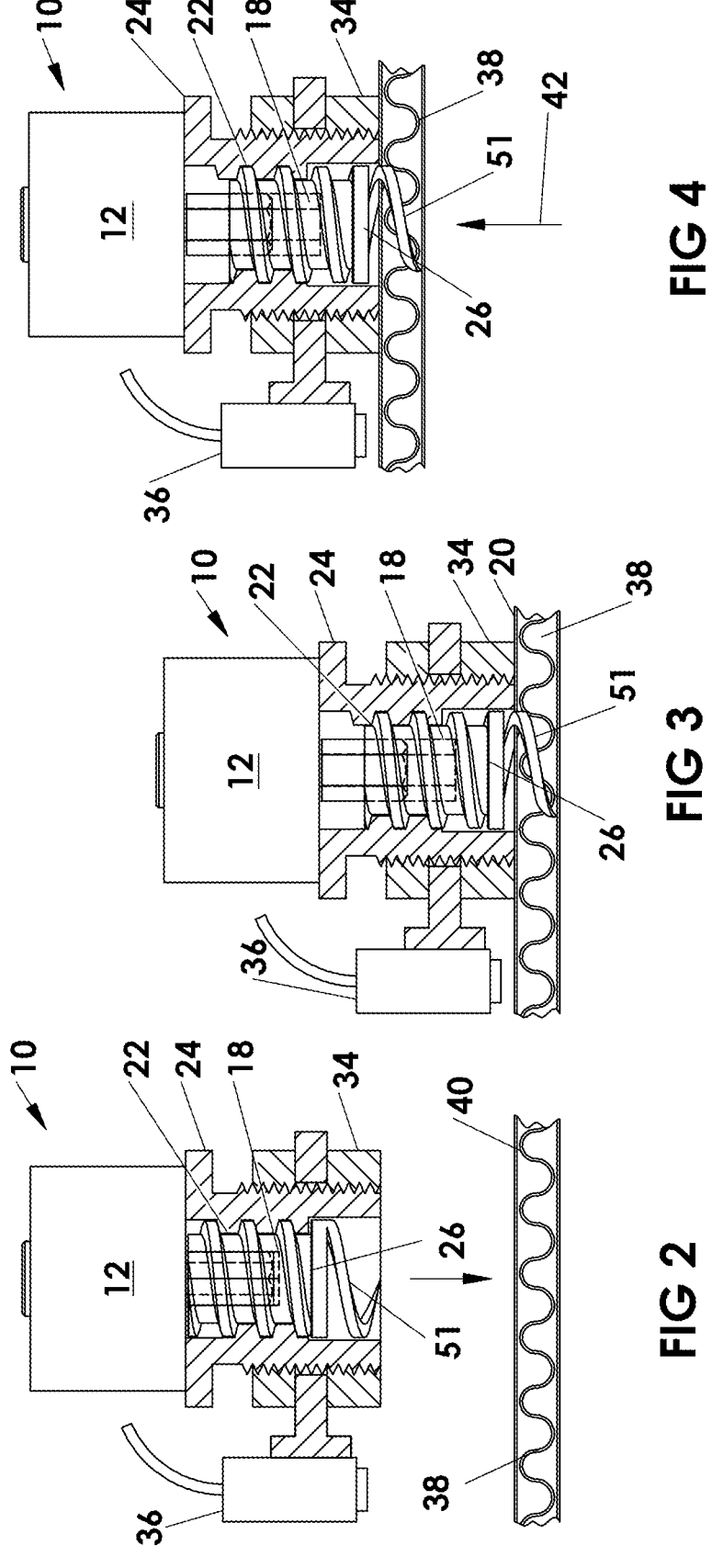
FIG. 2 shows a section view of the gripper in position spaced above a corrugated cardboard sheet about to be griped.
FIG. 3 shows the gripper in contact with the sheet of corrugated cardboard and the helical pin gripping element in gripping position.
FIG. 4 is a view similar to FIG. 3 with the helical pin extend and in gripping position within the sheet of corrugated cardboard and the gripper moved from its initial position and carrying the sheet with it.

The operation of the device is illustrated in FIGS. 2, 3 and 4. In these figures the helical gripping element 26 has a single helical gripping pin 51 as described in more detail below with reference to FIG. 5. In FIG. 2 the gripper 10 is spaced from the article 18 i.e., is in position to be moved into engagement with the article (corrugated board) 38 and the rotor 16 and thus the gripping element 26 are in a retracted position. The gripper 10 is moved into position with the nut 34 in engagement with the surface 40 of the article 38 and the sensor 36 has triggered the actuator 12 to move the rotor 16 and thus the helical 26 to extended gripping position as shown in FIG. 3. The action to move the helical pin gripping element 26 from retracted position as shown in FIG. 2 to the gripping position of FIG. 3 is obtained by rotating the rotor 16 through a preset angle which advances the rotor 16 and thus the helical pin gripping element 26 axially a specific distance while simultaneously rotating the rotor 16 and thus the helical penetrating pin 51 of the helical pin gripping element 26 penetrates the article 38 and grips same between the helical pin 51 and the adjacent end of the housing 24 or adjusting nut 34 if used.

FIG. 4 simply shows the gripper 10 being moved as indicated by the arrow 42 and thereby the article 38 because it is gripped by the gripper 10.

Figure 5:
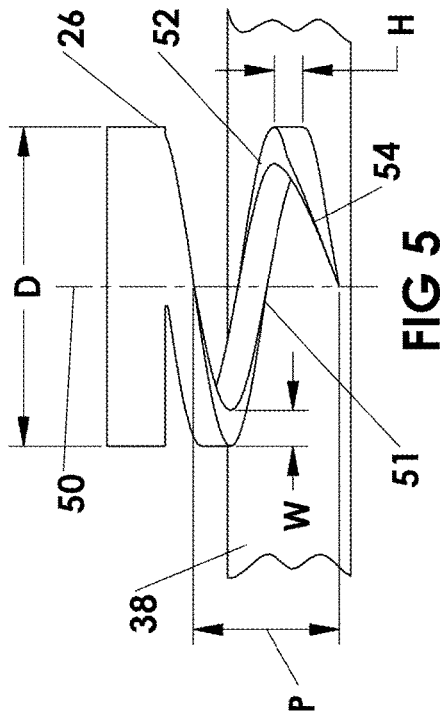
FIG. 5 is a side elevation view of the helical pin gripping element perse.

Turning to FIG. 5 a helical pin gripping element 26 having a single helical penetrating pin 51 is shown and has outside diameter D (the penetrating pin 51 or pins to be described below will generally be the same diameter D). The helical penetrating pin 51 has width W measured perpendicular to the rotational axis of the gripper 10 (i.e., of the rotor 16 and/or the helical pin gripping element 26, etc.), a pin thickness H measured parallel to the rotational axis 50 and a pitch P (axial length per 360'). While the pitch of the penetrating pin 51 need not be precisely equal to that of the threads 20 and 22 preferably they will be essentially the same. The diameter D will normally be in the range of 0.5 in to 1.5 in. The pin width W for most operations will be in the range of 0.06 in to inches and thickness H of 0.06 to 0.15 in. these Dimensions preferably are set to minimize the damage to the article being gripped on pin penetration when and when the article gripped is being manipulated. It will be noted that in the embodiment shown the penetrating pin 51 is not round, but has its surface 52 closest to the housing 24 flat and essentially extending radially of the axis 50. This configuration spreads the load and reduces stresses on the article being gripped when the gripper is moved. The leading or free end of the pin 51 is sharpened as indicated at 54.

Figure 6:
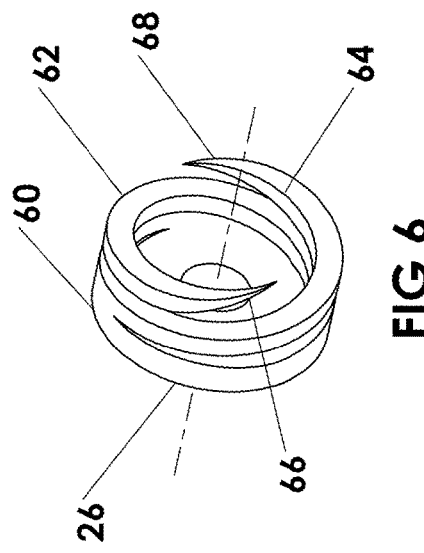
FIG. 6 is an isometric view illustrating the structure of a gripping element in the form of a double helical pin gripping element having a pair of opposed helical pins that form a double helical pin structure.
Figure 8:
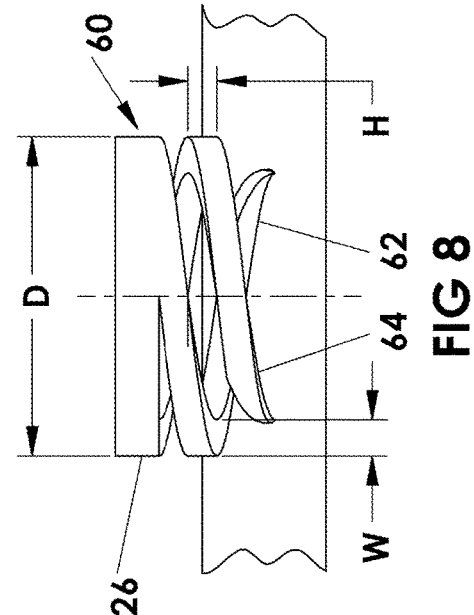
FIG. 8 is a side view of the double helical pin of FIG. 7.

FIG. 6 and FIG. 8 show a helical pin gripping element 26 having a double helical pin 60 which may be used in place of the gripping element 24 having single helical pin 51 discussed above. The double helical pin 60 comprises in effect 2 helical penetrating pins 62 and 64 offset circumferentially by 180° and each having a sharpened free end 66 and 68. The configuration of each of these pins 62 and 64 will essentially be the same as described above with reference to FIG. 5 for the single helical pin 51.

Figure 7:
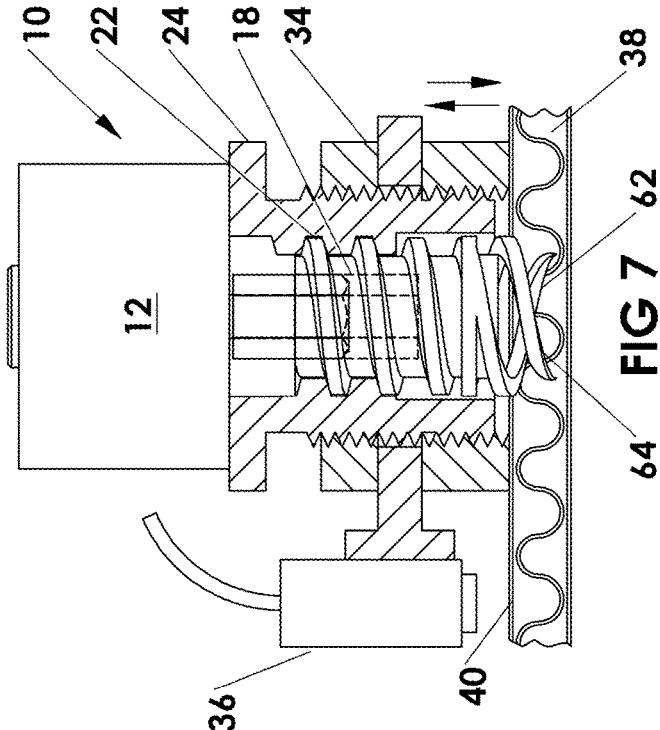
FIG. 7 is an illustration similar to FIG. 3 but with the double helical pin gripping element of FIG. 6 replacing the single helical pin shown in FIG. 3.

FIG. 7 shows the pins 62 and 64 of the double helical pin 60 penetrating an article (corrugated board) similar to the position shown in FIG. 3 for the single helical pin 51.

Figure 10:
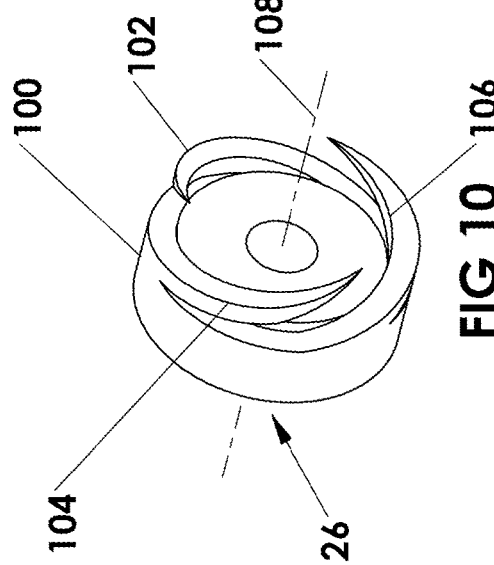
FIG. 10 is an isometric view similar to FIG. 6 showing a gripping element in the form of a triple helical gripping element having three pins symmetrically arranged relative to a rotational axis of the gripping element to form a triple helical pin structure.

Turning to FIG. 10 the helical gripping element 26 is in the form of a triple pin gripping element 100 having three helical penetrating pins 102, 104 and 106 symmetrically space around its rotational axis 108 (i.e. same as axis 50). The structure od these pins will be as described above with respect to penetrating pin 51 and as shown in FIG. 5.

The maximum rotation that may be applied to applied to each of the different embodiments i.e., single, double and triple helical pin gripping element without the penetration pins significantly damaging the substrate that they penetrate (more than that of the initial penetration hole) will vary significantly obviously the more pin the small the degree the helical pin gripping element 26 may be rotated without further damaging the substrate.

In the multiple penetrating pin embodiments (FIGS. 6 to 11) the penetrating pins of that particular device will all be essentially the same i.e. same dimensions, pitch, etc, as described above with reference to pin 51.

Figure 11:
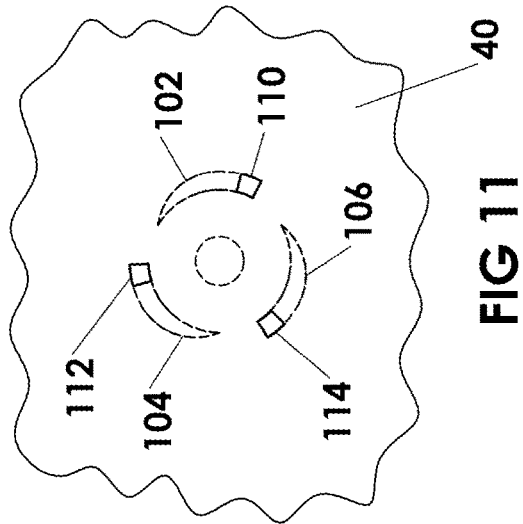
FIG. 11 is a sectional view looking into the board being penetrated from the surface of the board showing the penetration holes and location of the pins of the triple helical gripping element after penetration.

Turning to FIG. 11 the penetration holes formed when the penetrating pins 102, 104 and 106 penetrate the surface 40 (described above) are indicated at 110, 112 and 114 respectfully and the positions of the penetrating pin 102 104 and 106 are shown (under the surface layer 40) extending from their respective penetration hole.

Figure 9:
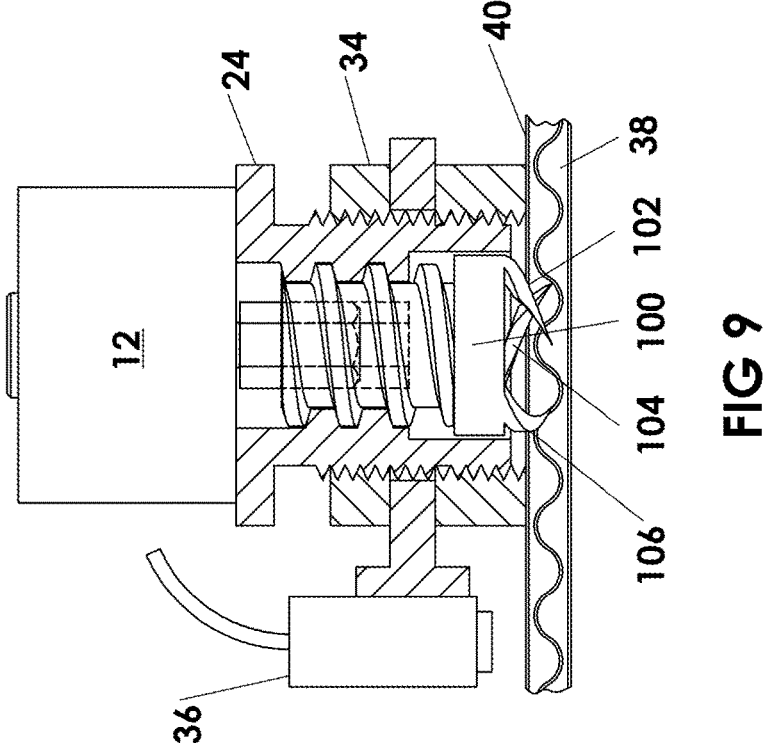
FIG. 9 is a view similar to FIGS. 3 and 7 but having a gripping element in the form of triple helical pin gripping element in place of the single or double helical gripping elements described above.
Figure 12:
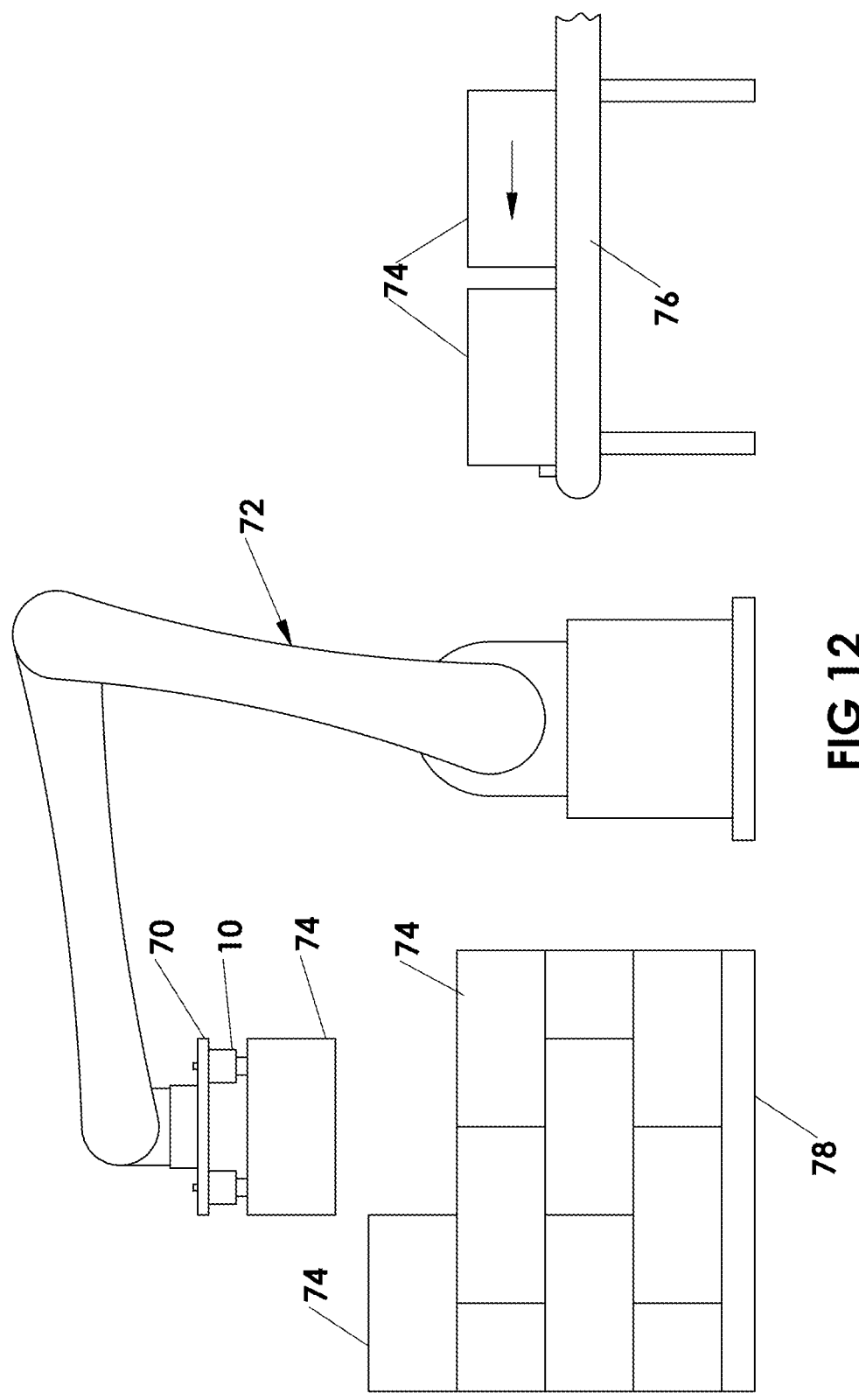
FIG. 12 shows a plurality of helical pin gripper of the present invention mounted on a moveable arm and used to move filled carons from one location to another.

In most operations a group of individual grippers 10 will be mounted on a flat plate 70 or the like so that the free ends 36 of the housings 24 (or nuts 34) are in essentially the same plane and that plate will be mounted on a mechanism such as the robot arm 72 shown in FIG. 12 and used to pick up articles such as filled cartons 74 and move them from a conveyor 76 and pile them on a pallet or the like 78 as shown in FIG. 9.

Generally, the individual grippers 10 will be arranged in groups general, groups of 4 placed one at each of the corners of a rectangle and a single sensor equivalent to the sensor 36 will be used to simultaneously trigger all the grippers in the group.

Figure 14:
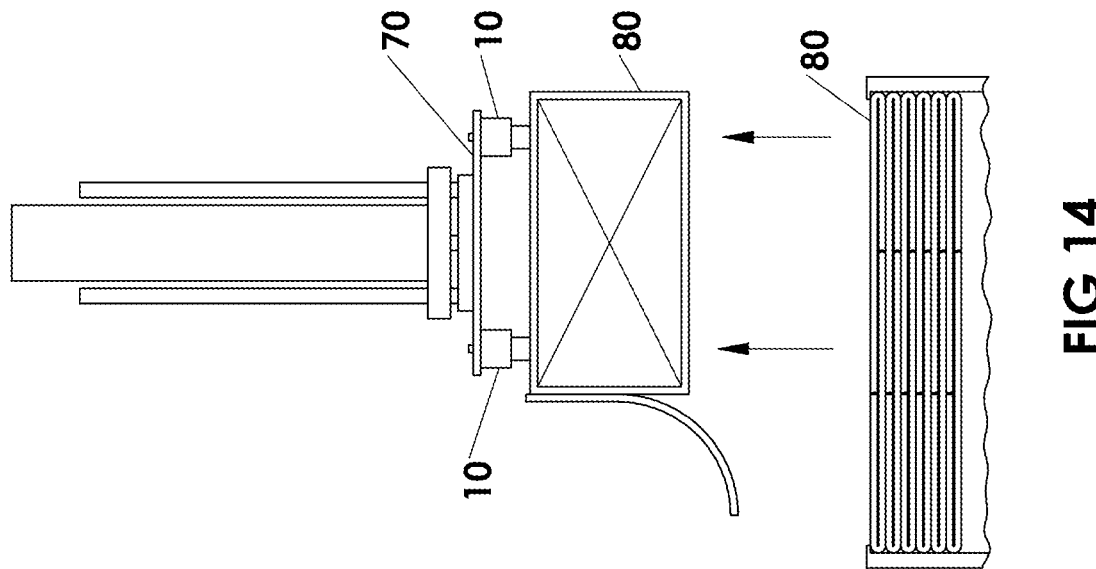
FIGS. 13 and 14 show the helical gripper as used in the squaring of box blanks.
Figure 13:
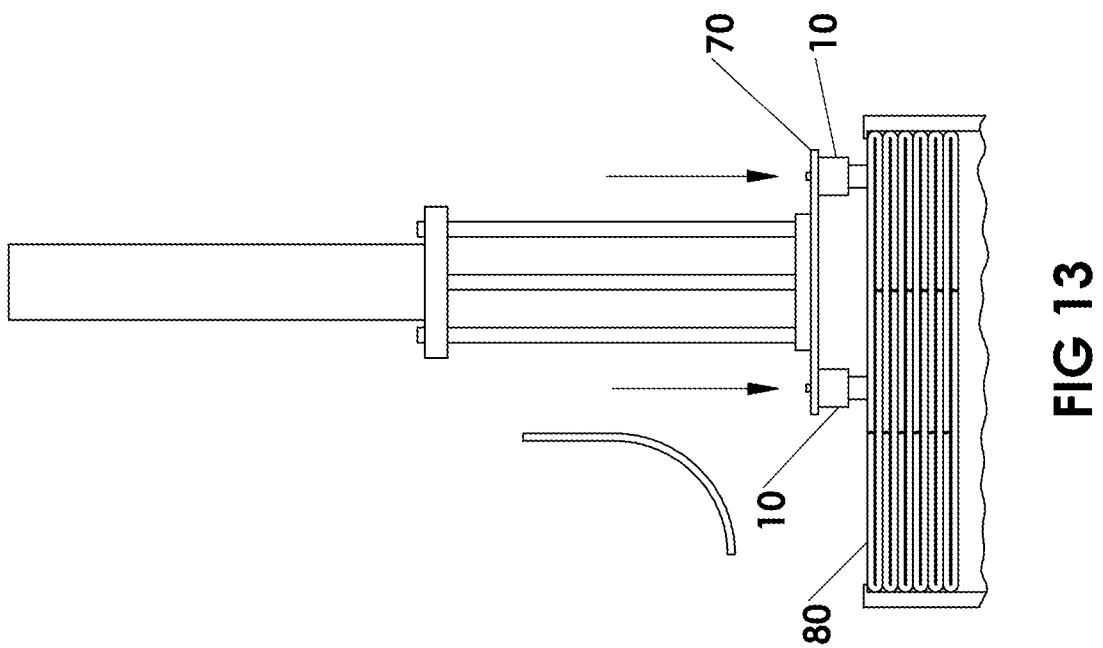

In another application shown in FIGS. 13 and 14 the grippers 10 mounted on a flat plate 70 so that as above indicated the free ends 36 of the housings 24 (or nuts 34) are in essentially the same plane and are being used in combination to grip a carton blank 80 and pull it to open and square the blank as illustrated. Having described the invention, modifications will be evident to those skilled in the art without departing from the scope of the invention as defined in the appended claims.

I claim:

1. A helical pin gripper comprising, a rotor mounted for rotation about a rotational axis, an actuator, a connector connecting said actuator to said rotor for rotating said rotor about said rotational axis while permitting axial movement of said rotor along said rotational axis, a housing surrounding said rotor and cooperating with said rotor, said housing being internally threaded and said rotor having threads on its periphery that mate with said internal threads to cause said rotor to move axial along said rotational axis when said rotator is rotated, a helical pin gripping element mounted on a free end of said rotor with its helical axis aligned with said rotational axis said helical pin gripping element is comprised of at least one helical penetrating pin with a sharpened end remote from said rotor.

2. A helical pin gripper as defined in claim 1 wherein said connector comprises an axially splined shaft, a splined passage in said rotor with its longitudinal axis concentric with said rotational axis, splines in said passage positioned to cooperate with said splined shaft to rotate said rotor with said splined shaft.

3. A helical pin gripper said as defined in claim 2 further comprising means to adjust the depth of penetration of said sharpened end into a surface of material being gripped by said gripper.

4. A helical pin gripper as defined in claim 2 wherein said helical penetrating pin has a flat surface adjacent to said housing.

5. A helical pin gripper said as defined in claim 1 further comprising means to adjust the depth of penetration of said sharpened end into a surface of material being gripped by said gripper.

6. A helical pin gripper as defined in claim 1 wherein said helical penetrating pin has a flat surface adjacent to said housing.

7. A helical pin gripper as defined in claim 1 wherein said helical pin gripping element is provided with three of said helical pin penetrating pins symmetrically positioned around said rotational axis.

8. A helical pin gripper as defined in claim 1 wherein said helical pin gripping element is provided with two of said helical pin penetrating pins symmetrically positioned around said rotational axis.

* * * * *